United States Patent [19]
Kawashima et al.

[11] Patent Number: 5,668,244
[45] Date of Patent: Sep. 16, 1997

[54] LIQUID POLYESTERS FROM CYCLIC ACID ANHYDRIDES

[75] Inventors: Miki Kawashima; Takeo Yamaguchi; Kunio Horiuchi; Hiromi Uchida, all of Tokyo, Japan

[73] Assignee: Toyo Ink Manufacturing Co., Ltd., Tokyo, Japan

[21] Appl. No.: 491,366

[22] Filed: Jun. 16, 1995

[30] Foreign Application Priority Data

Jun. 17, 1994 [JP] Japan ..................... 6-135517
Aug. 12, 1994 [JP] Japan ..................... 6-190243

[51] Int. Cl.$^6$ .......................................... C08G 63/42
[52] U.S. Cl. ..................... 528/297; 528/271; 528/272; 528/403; 528/405; 528/408; 554/156; 554/164; 554/165
[58] Field of Search ....................... 528/271, 272, 528/297, 403, 405, 406, 408; 554/156, 164, 165

[56] References Cited

U.S. PATENT DOCUMENTS

| 4,371,688 | 2/1983 | Moore ..................... 528/112 |
| 4,403,093 | 9/1983 | Hartman et al. ........... 525/297 |

*Primary Examiner*—Terressa Mosley
*Attorney, Agent, or Firm*—Wenderoth, Lind & Ponack

[57] ABSTRACT

A liquid polyester obtained by reacting a cyclic acid anhydride (A) containing at least 10 mol % of one of specific cyclic acid anhydrides with an epoxy compound (B) in a cyclic acid anhydride (A):epoxy compound (B) molar ratio of 10:8–10:12, can be applied with a conventionally generally used film-forming machine such as a roll coater or a printing machine, can easily give a film-forming material such as a solvent-free coating composition or ink and a curable liquid resin for use as an adhesive, is a low-temperature curing liquid polyester useful as a compatibilizer, a surface-tension modifier, a pigment dispersing agent and a metal chelating agent, and is curable in air in the presence of a relatively small amount of a catalyst.

13 Claims, No Drawings

LIQUID POLYESTERS FROM CYCLIC ACID ANHYDRIDES

FIELD OF THE INVENTION

The present invention relates to a liquid polyester which can be synthesized in the absence of a solvent and can be used as a resin for forming a film or a coating as a coating composition, an adhesive or an ink without using any solvent. Further, the present invention relates to a liquid polyester which has a long-chain aliphatic hydrocarbon group and therefore can be used as a compatibilizer, a surface-tension modifier and a pigment dispersing agent.

PRIOR ART OF THE INVENTION

Resin systems containing an organic solvent have been and are conventionally used for forming films or coatings as a coating composition, an adhesive or an ink. It is known that these resin systems dissipate a large amount of the organic solvent in the film-forming steps such as the steps of application and printing (the term "film-forming" in the present specification refers to the formation of a resin film or coating having a thickness of 0.1 to 100 μm on a substrate of paper, a metal, a plastic or ceramics) and in the drying and curing steps. With a recent increasing interest in the global environment and in working environments, various limitations are being imposed on the use of organic solvents. For this reason, there are various plans proposed, and measures being taken, for converting film-forming resins to solvent-free resins.

Resin systems employed as solvent-free resins are largely classified into a precursor system and a polymer system. Since the precursor system contains a monomer or a prepolymer having a low molecular weight, it has a low viscosity and is in a liquid state so that conventional film-forming methods such as application (painting) and printing methods can be employed without any change. However, the precursor system which is a composition containing a component having a low molecular weight dissipates the component having a lower molecular weight, and the precursor system is therefore further desired to be improved in safety and hygiene. Further, in the case of a coating composition constituted of a resin which is in an oligomer region, it is known that it is difficult to control the properties of a cured product of the coating composition ("Lectures of Adhesion and Coating Society", 1992, Collection of Symposium Summaries, page 4, 1993), and it is desired to increase its molecular weight with keeping its low molecular weight.

On the other hand, in the polymer system, it is required to convert a solid polymer into a liquid state by some method or to alter the film-forming method. Altering the film-forming method refers to the employment of a hot melt coating method or a powder coating method. As a typical conventional method of converting a solid polymer into a liquid state, there is a plastisol method in which a solid polymer is converted to a liquid state with a non-volatile plasticizer. However, the problem with this method is that it is difficult to obtain a cured product having sufficient hardness or that the plasticizer migrates. Further, there is a latex system which is an emulsion or a hydrosol. The problem with the latex system is that a cured product thereof is non-uniform or that the drying rate is low. Further, a water-soluble resin system, which is considered currently the most effective, still has problems in that the drying rate is low, that the water resistance is poor and that it is difficult to dispose of exhausted water. Moreover, almost all water-soluble resin systems contain at least 10% of an organic solvent for improving the system in the dispersibility of a pigment therein and film formability. Further, for the powder or hot melt resin system, the introduction of new facilities is required due to their great difference from the facilities used for conventional film-forming methods.

The present inventors have made diligent studies to overcome the above problems, and as a result have found the following. In the synthesis of a polyester by the ring-opening polymerization of an epoxy compound and a cyclic acid anhydride, the use of a specific cyclic acid anhydride can give a solvent-free liquid polyester which has a low viscosity while it has a high molecular weight, which permits the utilization of conventional film-forming methods such as coating and printing, and which is curable by the treatment of a coating or film formed therefrom with heat, light or electron beam.

SUMMARY OF THE INVENTION

It is an object of the present invention to provide a liquid polyester which can be applied with a conventionally generally used film-forming machine such as a roll coater or a printing machine.

It is another object of the present invention to provide a solvent-free liquid polyester which can easily give a film-forming material such as a solvent-free coating composition or ink and a curable liquid resin for use as an adhesive.

It is a further object of the present invention to provide a low-temperature curing liquid polyester useful as a compatibilizer, a surface-tension modifier, a pigment dispersing agent and a metal chelating agent.

It is a still further object of the present invention to provide a liquid polyester which is curable in air in the presence of a relatively small amount of a catalyst.

According to the present invention (the invention 1), there is provided a liquid polyester obtained by reacting a cyclic acid anhydride (A) containing at least 10 mol % of at least one of the cyclic acid anhydrides of the formulae (a) to (e),

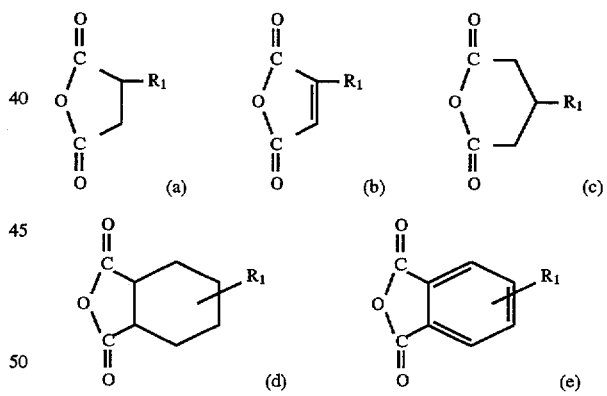

wherein $R_1$ is a saturated or unsaturated aliphatic hydrocarbon group having 4 to 25 carbon atoms, with an epoxy compound (B) in a cyclic acid anhydride (A):epoxy compound (B) molar ratio of 10:8–10:12.

Further, according to the present invention (the invention 2), there is provided a liquid polyester obtained by reacting the above cyclic acid anhydride (A) with the above epoxy compound (B) in a cyclic acid anhydride (A):epoxy compound (B) molar ratio of 10:8–10:12 in the presence of a dry or semi-dry partially saponified fat and oil having a saponification ratio of 5 to 90 %.

DETAILED DESCRIPTION OF THE INVENTION

In the present invention, the liquid polyester is produced from a cyclic acid anhydride (A) and an epoxy compound (B). The cyclic acid anhydride (A) is selected from aliphatic cyclic acid anhydrides such as succinic acid anhydride, itaconic acid anhydride, maleic acid anhydride, glutaric acid anhydride, hexahydrophthalic acid anhydride and tetrahydrophthalic acid anhydride; aromatic cyclic acid anhydrides such as phthalic acid anhydride, isatoic acid anhydride and diphenic acid anhydride, and derivatives of these acid anhydrides in which a saturated or unsaturated hydrocarbon group, an aryl group, a halogen atom or a heterocyclic group bonds to these acid anhydrides.

In the present invention 1, the cyclic acid anhydrides of the formulae (a) to (e) are used as a component for obtaining a polyester in a liquid state. In the present invention 2, the cyclic acid anhydrides of the formulae (a) to (e) are effective for obtaining a liquid polyester having a decreased viscosity.

In the formulae (a) to (e), $R_1$ is a saturated or unsaturated aliphatic hydrocarbon group having 4 to 25, preferably 5 to 22 carbon atoms. When the number of carbon atoms undesirably exceeds the above upper limit not only it is difficult to increase the polymerization degree of the liquid polyester, but also the liquid polyester has a high melting point so that the film formation requires a special heating device. When the number of carbon atoms is undesirably less than 4, or when a substituent as $R_1$ is not present, no intended liquid polyester is obtained or the liquid polyester has too high a viscosity. The aliphatic hydrocarbon group may be linear or branched, while a linear aliphatic hydrocarbon group is preferred in view of a decrease in the viscosity.

The cyclic acid anhydride having the above aliphatic hydrocarbon group includes alkyl succinic acid anhydrides of the formula (a) such as butylsuccinic acid anhydride, hexylsuccinic acid anthydride, octylsuccinic acid anhydride, dodecylsuccinic acid anthydride, tetradecylsuccinic acid anhydride. hexadecylsuccinic acid anhydride, octadecylsuccinic acid anhydride, nonenylsuccinic acid anhydride, eicosylsuccinic acid anhydride, heneicosylsuccinic acid anhydride, docosylsuccinic acid anthydride, decenylsuccinic acid anthydride, tetradecenylsuccinic acid anhydride, hexadecenylsuccinic acid anthydride, heptadecenylsuccinic acid anthydride, heptadecenylsuccinic acid anthydride, octadecenylsuccinic acid anhydride, eicosenylsuccinic acid anthydride, heneicosenylsuccinic acid anhydride and docosenylsuccinic acid anthydride;

alkylmaleic acid anhydrides of the formula (b) such as butylmaleic acid anhydride, pentylmaleic acid anthydride, hexylmaleic acid anhydride, octylmaleic acid anhydride, decylmaleic acid anhydride, dodecylmaleic acid anhydride, tetradecylmaleic acid anhydride, hexadecylmaleic acid anthydride, octadecylmaleic acid anthydride, eicosylmaleic acid anhydride, heneicosylmaleic acid anhydride, docosylmaleic acid anhydride, decenylmaleic acid anhydride, tetradecenylmaleic acid anhydride, hexadecenylmaleic acid anhydride, octadecenylmaleic acid anhydride, eicosenylmaleic acid anhydride, heneicosenylmaleic acid anhydride and docosenylmaleic acid anhydride;

alkylglutaric acid anhydrides of the formula (c) such as butylglutaric acid anhydride, hexylglutaric acid anhydride, heptylglutaric acid anhydride, octylglutaric acid anhydride, decylglutaric acid anhydride, dodecylglutaric acid anhydride, tetradecylglutaric acid anhydride, hexadecylglutaric acid anhydride, octadecylglutaric acid anhydride, eicosylglutaric acid anhydride, docosylglutaric acid anhydride, decenylglutaric acid anhydride, tetradecenylgluaric acid anhydride, hexadecenylgluaric acid anhydride, octadecenylglutaric acid anhydride, nonadecenylgluaric acid anhydride, eicosenylglutaric acid anhydride, heneicosenylglutaric acid anhydride and docosenylglutaric acid anhydride;

alkylcyclohexanedicarboxylic acid anhydrides of the formula (d) such as 4-n-butylcyclohexanedicarboxylic acid anhydride, 4-n-dodecylcyclohexanedicarboxylic acid anhydride, 4-n-tetradecylcyclohexanedicarboxylic acid anhydride, hexadecylcyclohexanedicarboxylic acid anhydride, octadecylhexahydrophthalic acid anhydride, docosylcyclohexanedicarboxylic acid anhydride, dodecylcyclohexanedicarboxylic acid anhydride, tetradecylcyclohexanedicarboxylic acid anhydride, hexadecylcyclohexanedicarboxylic acid anhydride, octadecylcyclohexanedicarboxylic acid anhydride, eicosylcyclohexanedicarboxylic acid anhydride, docosylcyclohexanedicarboxylic acid anhydride, decenylcyclohexanedicarboxylic acid anhydride, hexadecenylcyclohexanedicarboxylic acid anthydride, octadecenylcyclohexanedicarboxylic acid anhydride, docosenylcyclohexanedicarboxylic acid anhydride and tricosenylcyclohexanedicarboxylic acid anhydride; and alkylphthalic acid anhydrides such as 4-n-butylphthalic acid anhydride, hexylphthalic acid anhydride, octylphthalic acid anhydride, decylphthalic acid anthydride, dodecylphthalic acid anhydride, tetradecylphthalic acid anhydride, pentadecylphthalic acid anhydride, hexadecylphthalic acid anhydride, octadecylphthalic acid anhydride, nonadecylphthalic acid anhydride, eicosylphthalic acid anhydride, heneicosylphthalic acid anhydride, docosylphthalic acid anhydride, decenylphthalic acid anhydride, hexadecenylphthalic acid anhydride and heptadecenylphthalic acid anhydride.

The content of the above cyclic acid anhydride having a saturated or unsaturated aliphatic hydrocarbon group in the cyclic acid anhydride (A) is at least 10 mol %, preferably 30 mol %. When the above content is less than the above lower limit, no liquid polyester is obtained or the liquid polyester has too high a viscosity so that the film formation requires a special heating device.

In the present invention, the epoxy compound (B) is a component for forming the liquid polyester, and any epoxy compound whose molecule contains at least one epoxy group may be used. An epoxy compound containing a saturated or unsaturated hydrocarbon group is effective as an epoxy compound (B) for obtaining a liquid polyester having a decreased viscosity. The epoxy compound (B) includes methyl glycidyl ether, ethyl glycidyl ether, propyl glycidyl ether, butyl glycidyl ether, pentyl glycidyl ether, hexyl glycidyl ether, heptyl glycidyl ether, octyl glycidyl ether, nonyl glyeidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, octadecyl glycidyl ether, nonadecyl glycidyl ether, eicosyl glycidyl ether, heneicosyl glycidyl ether, docosyl glycidyl ether, tricosyl glycidyl ether, tetracosyl glycidyl ether, pentacosyl glycidyl ether, decenyl glycidyl ether, undecenyl glycidyl ether, tetradecenyl glycidyl ether, hexadecenyl glycidyl ether, heptadecenyl glycidyl ether, octadecenyl glycidyl ether, nonadecenyl glycidyl ether, eicosenyl glycidyl ether, heneicosenyl glycidyl ether, docosenyl glycidyl ether, tricosenyl glycidyl ether, tetracosenyl glycidyl ether and pentacosenyl glycidyl ether.

When an epoxy compound (B) containing a saturated or unsaturated aliphatic hydrocarbon group having 1 to 25 carbon atoms, preferably 4 to 22 carbon atoms, is selected from the above epoxy compounds, a liquid polyester having an effectively decreased viscosity can be obtained. The above aliphatic hydrocarbon group may be any one of linear and branched hydrocarbon groups, while a linear aliphatic hydrocarbon group is preferred in view of decreasing the viscosity.

In the present invention, for adjusting the solvent resistance and the mechanical properties of the liquid polyester, the epoxy compound (B) may be also selected from aromatic epoxy compounds such as phenyl glycidyl ether, butylphenyl glycidyl ether and phenylnitro glycidyl ether.

When it is required to cure the liquid polyester in the present invention, the epoxy compound (B) can be selected from epoxy compounds of which the molecule has one epoxy group and at least one unsaturated double bond. These epoxy compounds include glycidyl methacrylate, glycidyl acrylate, allyl glycidyl ether and glycidyl cinnamate. The amount of the epoxy compound of which the molecule has one epoxy group and at least one unsaturated double bond, based on the total amount of epoxy compounds (B) used, is 5 to 100 mol %, preferably 30 to 90 mol %. When the above amount is less than the above lower limit, it is difficult to obtain a hard film. When it exceeds 90 mol %, undesirably, the film is liable to be fragile.

The cyclic acid anhydride (A) is selected from the above-described compounds, and they are used alone or in combination. The epoxy compound (B) is selected from the above-described compound, and they are used alone or in combination. In view of impurities and the intended molecular of the liquid polyester, the cyclic acid anhydride (A):epoxy compound (B) molar ratio is 10:8 to 10:12, while these raw materials are basically preferably used in equimolar amounts.

In the present invention 1, it is preferred to use a hydroxyl group-containing compound (C) as an initiator for the reaction between the cyclic acid anhydride (A) and the epoxy compound (B) or for adjusting the molecular weight and the viscosity of the liquid polyester. The hydroxyl group-containing compound (C) includes aliphatic alcohols such as methyl alcohol, ethyl alcohol, propyl alcohol, butyl alcohol, pentyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, heneicosyl alcohol, docosyl alcohol, tricosyl alcohol, tetracosyl alcohol, pentacosyl alcohol, decenyl alcohol, methoxyethylene glycol, methoxydiethylene glycol, methoxytriethylene glycol and methoxytetraethylene glycol; aliphtatic diols such as ethylene glycol, diethylene glycol, triethylene glycol, tetraethylene glycol, polyethylene glycol, propylene glycol, polypropylene glycol, polypropylene-polyethylene glycol, 1,4-butylene glycol, 1,3-butylene glycol, polybutylene glycol, hexanediol and cyclohexanediol; aromatic diols such as bisphenol, bis(hydroyphenyl)methane and 2,2'-bis (hydroxyphenyl)propane; polyether diol and polyester diol. Of these, aliphatic alcohols and aliphatic diols are preferred since they serve to give a liquid polyester having a decreased viscosity. Further, hexamethylolmelamine, cyclodextrin, glycerin, trimethylolpropane and 1,2,6-hexanetriol may be used as a hydroxyl group-containing compound (C).

The partially saponified fat and oil used in the present invention 2 is a hydroxyl group-containing, partially saponified fat and oil obtained by partially saponifying a dry or semi-dry fat and oil having an iodine value of at least 100. In the present invention, the partially saponified fat and oil works as an initiator, a molecular weight regulator and a viscosity adjuster and forms terminals of the polyester formed from the cyclic acid anhydride (A) and the epoxy compound (B). Further, the partially saponified fat and oil works as an oxidation-curable site of which the oxidation is caused by oxygen in air. In the present invention 2, the hydroxyl group-containing compound (C) may be used in combination.

The dry or semi-dry fat and oil having an iodine value of at least 100 includes perilla oil, linseed oil, castor oil, safflower oil, sunflower oil, soybean oil, tung oil, illippe oil, oiticica oil, poppy seed oil, corn oil, carnauba wax, candelilla wax, rice oil, cotton seed oil, sesame oil and rape oil. It is preferred to use dry oils having an iodine value of at least 130 such as perilla oil, linseed oil, castor oil, safflower oil, sunflower oil, soybean oil and tung oil.

The partially saponified fat and oil can be quantitatively obtained by changing the amount of potassium hydroxide in a conventional fat and oil saponification method. The partial saponification ratio is 5 to 90%, preferably 10 to 70%. When the partial saponification ratio is lower than the above lower limit, the content of a fat and oil which bonds to the polyester is small and the fat and oil and the polyester show poor compatibility to each other so that, undesirably, the fat and oil and the polyester separate from each other, that the polyester becomes opaque and shows poor stability and that the cured product causes a problem of yellowing in some cases. When the partial saponification ratio exceeds the above upper limit, the content of fatty acid formed by the saponification is high, which can cause bleaching, distortion, and offensive odor after the liquid polyester is cured. Further, in this case, the content of the fat and oil which can bond to the polyester is also small, and the compatibility between the fatty acid or the fat and oil and the polyester is poor, so that the fat and oil and the polyester separate from each other and the polyester becomes opaque. The unsaturated carboxylic acid formed by the saponification may be removed by a distillation method, or the like as required.

The amount of the partially saponified fat and oil and/or the hydroxyl group-containing compound (C) has an influence on the molecular weight of the liquid polyester. For obtaining the liquid polyester having a number average molecular weight (Mn) of 1,000 to 30,000, the amount of the hydroxyl group-containing compound (C) per mole of the cyclic acid arthydride (A) preferably is 0.001 to 0.2 equivalent, more preferably 0.005 to 0.1 equivalent.

Further, the amount of the partially saponified fat and oil based on the total amount of the hydroxyl group-containing compound (C) is preferably 5 to 100 equivalent %, more preferably 10 to 90 equivalent %. When the above amount is less than the above lower limit, undesirably, the oxidation-curability is not effectively exhibited. Further, when the problem of yellowing is important, the partially saponified fat and oil is used preferably in an amount of not exceeding 90 equivalent %.

In the present invention, when the epoxy compound having an unsaturated double bond is used, a radical polymerization inhibitor may be used. The radical polymerization inhibitor is selected from phenols such as hydroquinone, hydroquinone monomethyl ether, p-tert-butyleatechol, 2,5-di-tert-butylhydroquinone, tert-butylhydroquinone, 2,5-diamylhydroquinone and di-tert-butyl-p-cresol; quinones such as p-benzoquinone, naphthoquinone and 2,5-diphenyl-p-benzoquinone; oximes such as quinonedioxime and cyclohexanoxime; amidines such acetoamidine acetate; quaternary ammonium salts; hydrazines; and amine hydrochlorides.

The amount of the radical polymerization inhibitor based on the epoxy compound having an unsaturated double bond is 0.1 to 4% by weight, preferably 0.1 to 1.0% by weight. When the above amount is less than the above lower limit, all of the unsaturated double bonds react and gelation takes place during the synthesis of the liquid polyester so that it is difficult to continue the reaction stably. When the above amount exceeds the above upper limit, undesirably, the liquid polyester shows poor reactivity when cured. Further, the gelation can be prevented by increasing the oxygen content in the reaction atmosphere.

The mutual copolymerization of the cyclic acid anhydride (A) and the epoxy compound (B) may be carried out in the presence of a known catalyst of a Lewis base or a tertiary amine such as sodium hydroxide, potassium hydroxide, lithium chloride, diethylzinc, tetra(n-butoxy)titanium or N,N-diethylbenzylamine. The amount of the catalyst based on the cyclic acid anhydride (A) is 0 to 0.5 mol %, preferably 0.1 to 0.3 mol %. The above polymerization proceeds in the absence of the above catalyst, while the catalyst has an effect on decreasing the reaction time. However, when the amount of the catalyst exceeds the above upper limit, undesirably, the liquid polyester turns yellowish or it is difficult to obtain the liquid polyester having a high molecular weight.

The liquid polyester is synthesized by adjusting the amount of the hydroxyl group-containing compound or the catalyst such that it has a number average molecular weight, measured by a GPC method (gel permeation chromatography), of 1,000 to 30,000, preferably 2,000 to 20,000. When the above number average molecular weight is smaller than the above lower limit, undesirably, the volume shrinkage percentage in a cure time is large and there may be a decrease in mechanical properties, e.g., distortion or peeling from a substrate so that the film or coating (product) show decreased properties in solvent resistance and boiling water resistance. When the above number average molecular weight is greater than the above upper limit, undesirably, the liquid polyester no longer has a low viscosity for forming a film.

The liquid polyester of the present invention can be produced by heating the above raw materials in the absence of a solvent at a temperature between 60° C. and 100° C. according to a known ring-opening polymerization method. In the present invention, a solvent may be used in some cases for decreasing the viscosity of the reaction mixture or for proceeding with the polymerization stably. The solvent used for this purpose is preferably selected from those having a boiling point of 70° to 85° C. for easily controlling the temperature during the reaction. This solvent generally includes ethyl acetate, benzene and methyl ethyl ketone. When the amount of the solvent is large, unpractically, the reactivity of the polymerization decreases so that the production takes a long time. The amount of the solvent based on the total amount of the cyclic acid anhydride (A), the epoxy compound (B), the hydroxyl group-containing compound (C) and the partially saponified fat and oil is 0 to 60% by weight, preferably 15 to 30% by weight. However, it is required to remove the solvent after the polymerization, and it is therefore preferred not to use any solvent.

The liquid polyester of the present invention has a viscosity, measured at 50° C. with a viscometer such as a rotational vibration viscometer VM-100 (supplied by Yamaichi Electric Co., Ltd.) and a rheometer RDGII (supplied by Rheometric Inc.), of 100 to 500,000 cps, preferably 100 to 20,000 cps.

The liquid polyester of the present invention can be used as a substantially solvent-free film-forming material or adhesive. However, for improving the liquid polyester in film formability, a small amount of water or an organic solvent may be incorporated. The amount of the water or the organic solvent is up to 5% by weight based on the liquid polyester. Further, when the liquid polyester of the present invention is cured, a curing aid as an initiator may be used for improving the liquid polyester in curability as required. The curing aid is selected from organic peroxides such as benzoyl peroxide, azo compounds such as azobisisobutyronitrile, and general radical-polymerization initiators or optical polymerization initiators such as ammonium persulfate and lauroyl peroxides depending upon the kind of the unsaturated double bond introduced as a curable site. Further, for promoting the curability of the curable site, a catalyst as a dryer may be used, and it is selected from metal salts such as cobalt naphthenate, cobalt octenate, manganese naphthenate, zirconium naphthenate, vanadyl octenate, calcium naphthenate, barium naphthenate and zinc naphthenate. The amount of the above initiator or the catalyst based on the liquid polyester is 0 to 3% by weight. The liquid polyester may further contain titanium white, a colorant selected from various pigments, and a lubricant.

A film of the liquid polyester of the present invention can be formed on a substrate selected from various metal plates such as a steel plate and an aluminum plate, a plastic film and paper by any one of a roll coating method, a knife coating method, a curtain coating method, a coil coating method, a spray coating method, lithography, a letter press printing method, a silk screen printing method and an intaglio printing method. A film of the applied liquid polyester can be easily formed by heating. Further, a film of the applied liquid polyester can be cured by treating it with heat, light or electron beam. The heat source is generally selected from a heat circulating oven and a heating roll although it is not specially limited. The light source is selected from a mercury lamp, a xenon lamp, a fluorescent lamp, an incandescent lamp and various lasers, while the curing with UV light from a mercury lamp is preferred since it is generally used.

EXAMPLES

The present invention will be explained in detail hereinafter with reference to Examples. Abbreviations appearing in Examples stand for the following.

<Cyclic acid anhydride (A)>

OcAH: Octylsuccinic acid anhydride

DcAH: Decylsuccinic acid anhydride

DdAH: Dodecylsuccinic acid anhydride

TdAH: Tetradecylsuccinic acid anhydride

HdAH: Hexadecylsuccinic acid anhydride

OdAH: Octadecylsuccinic acid anhydride

PHA: Phthalic acid anhydride

HHPA: Hexahydrophthalic acid anhydride

MHPA: Methylhexahydrophthalic acid anhydride

<Epoxy compound (B)>

MGE: Methyl glycidyl ether

BGE: Butyl glycidyl ether

DGE: Decyl glycidyl ether

SGE: Octadecyl glycidyl ether

PGE: Phenyl glycidyl ether

GMA: Glycidyl methacrylate

<Hydroxyl group-containing compound (C)>

BuOH: Butanol

DdOH: Dodecyl alcohol
EG: Ethylene glycol
<Catalyst>
DMBA: Dimethylbenzylamine

PREPARATION EXAMPLE 1

A 500-ml four-necked round-bottom flask having a stirrer, a temperature sensor and a condenser was charged with the following.

| | |
|---|---|
| n-BuOH | 7.4 g |
| n-TdAH | 296.5 g |
| MGE | 89.0 g |
| DMBA | 2.7 g |

The temperature in the flask was increased to 85° C. with stirring while the flask was placed in a hot water bath. As the polymerization proceeded, the reaction mixture in the flask became viscous. The reaction was continued at 85° C. for 20 hours and then the reaction product was measured for an acid value according to JIS K 0070 (acid values hereinafter were all obtained by the same measurement as that described here) to show 13 mgKOH/g. The reaction was further continued for 5 hours, and then the reaction product was measured for an acid value to show less than 9 mgKOH/g. The reaction product was allowed to cool to finish the reaction.

The resultant viscous liquid (liquid polyester) was measured for a number average molecular weight (Mn) by a GPC method to show 3,460. The liquid polyester had a viscosity, measured at 50° C. with a rotational vibration viscometer VM-100 (supplied by Yamaichi Electric Co., Ltd.), of 990 cps.

PREPARATION EXAMPLES 2–11

Liquid polyesters were synthesized from raw materials shown in Table 1 in the same manner as in Preparation Example 1. In each Preparation Example, the reaction was terminated when the acid value became less than 10 mgKOH/g. The liquid polyesters were measured for a number average molecular weight and a viscosity. Table 1 shows the results.

TABLE 1

| Preparation Example | Composition | | | | Molecular weight Mn | Viscosity (50° C.) (cps) |
|---|---|---|---|---|---|---|
| | Cyclic acid anhydride (A) | Epoxy compound (B) | Hydroxyl group-containing compound (C) | Catalyst, etc. | | |
| 1 | n-TdAH 296.5 g | MGE 89.0 g | n-BuOH 7.4 g | DMBA 2.7 g | 3,460 | 990 |
| 2 | n-OcAH 212.3 g | MGE 89.0 g | n-BuOH 7.4 g | DMBA 2.7 g | 2,700 | 1,720 |
| 3 | n-DcAH 240.3 g | MGE 89.0 g | n-BuOH 7.4 g | DMBA 2.7 g | 2,960 | 1,260 |
| 4 | n-HdAH 324.5 g | MGE 89.0 g | n-BuOH 7.4 g | DMBA 2.7 g | 3,700 | 1,320 |
| 5 | n-TdAH 296.5 g | BGE 130.0 g | n-BuOH 7.4 g | DMBA 2.7 g | 3,850 | 1,090 |
| 6 | n-TdAH 296.5 g | DGE 214.0 g | n-BuOH 7.4 g | DMBA 2.7 g | 4,600 | 1,000 |
| 7 | n-TdAH 296.5 g | BGE 130.0 g | n-DdOH 15.8 g | DMBA 2.7 g | 3,830 | 920 |
| 8 | n-TdAH 296.5 g | BGE 130.0 g | EG 6.8 g | DMBA 2.7 g | 3,850 | 1,200 |
| 9 | n-TdAH 148.3 g PAH 74.0 g | MGE 89.0 g | n-BuOH 7.4 g | DMBA 2.7 g | 2,800 | 3,300 |
| 10 | n-TdAH 296.5 g | BGE 130.0 g | n-BuOH 3.7 g | DMBA 2.7 g | 6,900 | 2,000 |
| 11 | n-TdAH 296.5 g | BGE 130.0 g | n-BuOH 2.5 g | DMBA 2.7 g | 10,000 | 3,200 |

COMPARATIVE EXAMPLE 1

A 500-ml four-necked round-bottom flask having a stirrer, a temperature sensor and a condenser was charged with the following.

| | |
|---|---|
| n-BuOH | 7.4 g |
| PAH | 148.0 g |
| MGE | 89.0 g |
| DMBA | 2.7 g |

The temperature in the flask was increased to 85° C. with stirring while the flask was placed in a hot water bath. As the polymerization proceeded, the reaction mixture in the flask became considerably viscous, and 10 hours after the reaction was initiated, it is difficult to continue the stirring. The stirring was therefore terminated, and the reaction was further continued for 10 hours. The reaction product was measured for an acid value to show 11 mgKOH/g. The reaction mixture was heated at 85° C. for 5 hours, and the reaction product was measured for an acid value to show less than 7 mgKOH/g. The reaction product was allowed to cool to terminate the reaction. The reaction product showed no fluidity and was in a solid state at 50° C.

The so-obtained polyester was measured for a number average molecular weight (Mn) by a GPC method to show 2,100.

COMPARATIVE EXAMPLE 2

A 500-ml four-necked round-bottom flask having a stirrer, a temperature sensor and a condenser was charged with the following.

| | |
|---|---|
| n-BuOH | 7.4 g |
| n-TdAH | 14.8 g |
| PAH | 140.6 g |
| MGE | 89.0 g |
| DMBA | 2.7 g |

The temperature in the flask was increased to 85° C. with stirring while the flask was placed in a hot water bath. As the polymerization proceeded, the reaction mixture in the flask became considerably viscous, and 10 hours after the reaction was initiated, it is difficult to continue the stirring. The stirring was therefore terminated, and the reaction was further continued for 10 hours. The reaction product was measured for an acid value to show 11 mgKOH/g. The reaction mixture was heated at 85° C. for 5 hours, and the reaction product was measured for an acid value to show less than 8 mgKOH/g. The reaction product was allowed to cool to terminate the reaction. The reaction product showed almost no fluidity at 50° C., and had a viscosity, measured at 50° C., of more than 1,000,000 cps.

The so-obtained polyester was measured for a number average molecular weight Mn by a GPC method to show 2,220.

PREPARATION EXAMPLE 12

A 500-ml four-necked round-bottom flask having a stirrer, an air-introducing tube (flow rate: 20 ml/minute), a temperature sensor and a condenser was charged with the following.

| | |
|---|---|
| n-BuOH | 7.4 g |
| n-TdAH | 296.5 g |
| CMA | 56.8 g |
| BGE | 78.0 g |
| DMBA | 2.7 g |
| Hydroquinone | 0.25 g |

The temperature in the flask was increased to 85° C. with stirring while the flask was placed in a hot water bath. As the polymerization proceeded, the reaction mixture in the flask became viscous. The reaction was continued at 85° C. for 20 hours and then the reaction product was measured for an acid value to show 13 mgKOH/g. The reaction was further continued for 5 hours, and then the reaction product was measured for an acid value to show less than 9.5 mgKOH/g. The reaction product was allowed to cool to finish the reaction.

The resultant viscous liquid (liquid polyester) was measured for a number average molecular weight (Mn) by a GPC method to show 3,800. The liquid polyester had a viscosity, measured at 50° C., of 5,000 cps.

PREPARATION EXAMPLES 13–19

Liquid polyesters were synthesized from raw materials shown in Table 1 in the same manner as in Preparation Example 12. In each Preparation Example, the reaction was terminated when the acid value became less than 10 mgKOH/g. The liquid polyesters were measured for a number average molecular weight and a viscosity. Table 2 shows the results.

TABLE 2

| Preparation Example | Composition | | | | Molecular weight Mn | Viscosity (50° C.) (cps) |
|---|---|---|---|---|---|---|
| | Cyclic acid anhydride (A) | Epoxy compound (B) | Hydroxyl group-containing compound (C) | Catalyst, etc. | | |
| 12 | n-TdAH 296.5 g | BGE 78.0 g GMA 56.8 g | n-BuOH 7.4 g | DMBA 2.7 g hydroquinone 0.28 g | 3,460 | 890 |
| 13 | n-TdAH 296.5 g | BGE 91.0 g GMA 42.6 g | n-BuOH 7.4 g | DMBA 2.7 g hydroquinone 0.21 g | 3,850 | 683 |
| 14 | n-TdAH 296.5 g | BGE 65.0 g GMA 71.0 g | n-BuOH 7.4 g | DMBA 2.7 g hydroquinone 0.36 g | 3,900 | 848 |
| 15 | n-TdAH 296.5 g | BGE 39.0 g GMA 99.4 g | n-BuOH 7.4 g | DMBA 2.7 g hydroquinone 0.50 g | 3,900 | 1,000 |
| 16 | n-OcAH 212.3 g | GMA 142.0 g | n-BuOH 7.4 g | DMBA 2.7 g hydroquinone 0.71 g | 3,190 | 2,030 |
| 17 | n-DdAH 268.0 g | GMA 142.0 g | n-BuOH 7.4 g | DMBA 2.7 g hydroquinone 0.71 g | 3,690 | 1,320 |
| 18 | n-HdAH 324.5 g | GMA 142.0 g | n-BuOH 7.4 g | DMBA 2.7 g hydroquinone 0.71 g | 3,690 | 1,160 |

TABLE 2-continued

| | Composition | | | | | |
|---|---|---|---|---|---|---|
| Preparation Example | Cyclic acid anhydride (A) | Epoxy compound (B) | Hydroxyl group-containing compound (C) | Catalyst, etc. | Molecular weight Mn | Viscosity (50° C.) (cps) |
| 19 | n-TdAH 296.5 g | BGE 78.0 g GMA 56.8 g | n-BuOH 3.7 g | DMBA 2.7 g hydroquinone 0.28 g | 6,900 | 2,500 |

EXAMPLE 1

Benzoyl peroxide was added to, and fully mixed with, the liquid polyester obtained in Preparation Example 12 to obtain a curable liquid resin composition. In this case, the amount of the benzoyl peroxide was 3% by weight based on the liquid polyester. The curable liquid resin composition was measured for curing behaviors with a rheometer (RDS-II, supplied by Rheometrics Inc.). The conditions for the measurement were as follows.

Detection portion: Parallet plate (diameter 8 mm)
Frequency: 1 Hz
Heating temperature: 100° C.
Time: Value after 20 minutes was taken.

The cured resin composition was measured for a modulus in shear, and Table 3 show the result.

EXAMPLES 2–8

Various initiators (curing catalysts as shown in Table 3) were added to, and fully mixed with, the liquid polyesters obtained in Preparation Examples 13 to 19, and the resultant curable liquid resin compositions were measured for curing behaviors with a rheometer under the same conditions as those in Example 1. The cured resin compositions were measured for modulus in shear, and Table 3 shows the results.

TABLE 3

| Example No. | Resin from Prep. Example | Curing catalyst 8 Amount | Modulus in shear dyn/cm$^2$ |
|---|---|---|---|
| 1 | 12 | Benzoyl peroxide 3 wt % | $3.5 \times 10^7$ |
| 2 | 13 | Benzoyl peroxide 3 wt % | $5.8 \times 10^6$ |
| 3 | 14 | Benzoyl peroxide 3 wt % | $1.0 \times 10^8$ |
| 4 | 15 | Benzoyl peroxide 3 wt % | $3.3 \times 10^8$ |
| 5 | 16 | Isobutyl peroxide 3 wt % | $2 \times 10^{10}$ |
| 6 | 17 | Octanoyl peroxide 3 wt % | $7.0 \times 10^9$ |
| 7 | 18 | Benzoyl peroxide 3 wt % | $1.3 \times 10^9$ |
| 8 | 19 | Octanoyl peroxide 3 wt % | $4.0 \times 10^7$ |

PREPRATION EXAMPLE 20

Synthesis of 20% Saponified Product of Linseed Oil

A 500-ml four-necked round-bottom flask having a stirrer, a temperature sensor, a nitrogen-introducing tube (flow rate: 20 ml/minute) and a condenser was charged with 250 g of a linseed oil (saponification value: 194 mgKOH/g) and 339 ml of ethanolic potassium hydroxide (0.5N), and the mixture was refluxed with stirring for 30 minutes while the flask was placed in a hot water bath at 85° C. Then, the reaction mixture was allowed to cool to a temperature around room temperature, and then placed in a separatory funnel. Then, 350 ml of 0.5N hydrochloric acid was added, and the mixture was fully shaken to neutralize the reaction mixture. The reaction mixture was allowed to stand for 30 minutes, and when the mixture was completely separated into two layers, the lower layer (aqueous phase) was discarded and the supernalant was recovered. The recovered supernatant was placed in an eggplant-type flask (internal volume: 500 ml), and while the flask was warmed in a hot water bath at 50° C., the pressure in the eggplant-type flask was reduced to 5 mmHg with a vacuum pump having a liquid nitrogen trap to remove volatiles such as water, ethanol, and the like. The resultant amber-colored liquid was measured for an acid value according to JIS K0070 (acid values were measured in the same manner hereinafter) to show 37.1 mgKOH/g so that it was confirmed that the saponification ratio was 19.1%.

(Number of hydroxyl groups per g)=$0.677 \times 10^{-3}$

PREPARATION EXAMPLE 21

Synthesis of 33% Saponified Product of Linseed Oil

A 1-liter four-necked round-bottom flask having a stirrer, a temperature sensor, a nitrogen-introducing tube (flow rate: 20 ml/minute) and a condenser was charged with 250 g of a linseed oil (saponification value: 194 mgKOH/g) and 564.5 ml of ethanolic potassium hydroxide (0.5N), and the mixture was refluxed with stirring for 30 minutes while the flask was placed in a hot water bath at 85° C. Then, the reaction mixture was allowed to cool to a temperature around room temperature, and then placed in a separatory funnel. Then, 600 ml of 0.5N hydrochloric acid was added, and the mixture was fully shaken to neutralize the reaction mixture. The reaction mixture was allowed to stand for 30 minutes, and when the mixture was completely separated into two layers, the lower layer (aqueous phase) was discarded and the supernatant was recovered. The recovered supernatant was placed in an eggplant-type flask (internal volume: 500 ml), and while the flask was warmed in a hot water bath at 50° C., the pressure in the eggplant-type flask was reduced to 5 mmHg with a vacuum pump having a liquid nitrogen trap to remove volatiles such as water, ethanol, and the like. The resultant amber-colored liquid was measured for an acid value to show 60.3 mgKOH/g so that it was confirmed that the saponification ratio was 31%.

(Number of hydroxyl groups per g)=$1.13 \times 10^{-3}$

PREPARATION EXAMPLE 22

Synthesis of 50% Saponified Product of Linseed Oil

A 1-liter four-necked round-bottom flask having a stirrer, a temperature sensor, a nitrogen-introducing tube (flow rate: 20 ml/minute) and a condenser was charged with 100 g of a linseed oil (saponification value: 194 mgKOH/g) and 339 ml of ethanolic potassium hydroxide (0.5N), and the mixture was refluxed with stirring for 30 minutes while the flask was placed in a hot water bath at 85° C. Then, the reaction mixture was allowed to cool to a temperature around room temperature, and then placed in a separatory funnel. Then, 350 ml of 0.5N hydrochloric acid was added, and the mixture was fully shaken to neutralize the reaction mixture. The reaction mixture was allowed to stand for 30 minutes, and when the mixture was completely separated into two layers, the lower layer (aqueous phase) was discarded and the supernatant was recovered. The recovered supernatant was placed in an eggplant-type flask (internal volume: 300 ml), and while the flask was warmed in a hot water bath at 50° C., the pressure in the eggplant-type flask was reduced to 5 mmHg with a vacuum pump having a liquid nitrogen trap to remove volatiles such as water, ethanol, and the like. The resultant amber-colored liquid was measured for an acid value to show 96 mgKOH/g so that it was confirmed that the saponification ratio was 49.5%.

(Number of hydroxyl groups per g)=$1.69 \times 10^{-3}$

PREPARATION EXAMPLE 23

Synthesis of 20% Saponified Product of Tung Oil

A 1-liter four-necked round-bottom flask having a stirrer, a temperature sensor, a nitrogen-introducing tube (flow rate: 20 ml/minute) and a condenser was charged with 250 g of a tung oil (saponification value: 192 mgKOH/g) and 339 ml of ethanolic potassium hydroxide (0.5N), and the mixture was refluxed with stirring for 30 minutes while the flask was placed in a hot water bath at 85° C. Then, the reaction mixture was allowed to cool to a temperature around room temperature, and then placed in a separatory funnel. Then, 350 ml of 0.5N hydrochloric acid was added, and the mixture was fully shaken to neutralize the reaction mixture. The reaction mixture was allowed to stand for 30 minutes, and when the mixture was completely separated into two layers, the lower layer (aqueous phase) was discarded and the supernatant was recovered. The recovered supernatant was placed in an eggplant-type flask (internal volume: 500 ml), and while the flask was warmed in a hot water bath at 50° C., the pressure in the eggplant-type flask was reduced to 5 mmHg with a vacuum pump having a liquid nitrogen trap to remove volatiles such as water, ethanol, and the like. The resultant amber-colored liquid was measured for an acid value to show 38.0 mgKOH/g so that it was confirmed that the saponification ratio was 20%.

(Number of hydroxyl groups per g)=$0.684 \times 10^{-3}$

EXAMPLE 9

A 500-ml four-necked round-bottom flask having a stirrer, a temperature sensor, a nitrogen-introducing tube (flow rate: 20 ml/minute) and a condenser was charged with 36.9 g of a 20%-saponified linseed oil (Preparation Example 20), 84.0 g of MHPA, 65.0 g of BGE and 1.35 g of DMBA, and the temperature inside the flask was increased to 85° C. with stirring while the flask was placed in a hot water bath. As the polymerization proceeded, the reaction mixture in the flask became viscous, and the reaction was further continued for 10 hours under the same conditions. The reaction product was measured for an acid value to show 18 mgKOH/g. The reaction mixture was heated at 85° C. for 10 hours, and the reaction product was measured for an acid value to show 10 mgKOH/g. The reaction product was allowed to cool to terminate the reaction.

The so-obtained yellow viscous liquid (liquid polyester) was measured for a number average molecular weight (Mn) by a GPC method to show 2,000, and measured for a viscosity at 50° C. to show 25,000 cps.

EXAMPLE 10

A 500-ml four-necked round-bottom flask having a stirrer, a temperature sensor, a nitrogen-introducing tube (flow rate: 20 ml/minute) and a condenser was charged with 36.9 g of a 20-saponified linseed oil (Preparation Example 20), 84.0 g of MHPA, 42.6 g of GMA, 42.8 g of DGE, 1.35 g of DMBA and 0.213 g of hydroquinone, and the temperature inside the flask was increased to 85° C. with stirring while the flask was placed in a hot water bath. As the polymerization proceeded, the reaction mixture in the flask became viscous, and the reaction was further continued for 10 hours under the same conditions. The reaction product was measured for an acid value to show 20 mgKOH/g. The reaction mixture was heated at 85° C. for 10 hours, and the reaction product was measured for an acid value to show 12 mgKOH/g. The reaction product was allowed to cool to terminate the reaction.

The so-obtained viscous liquid (liquid polyester) was measured for a number average molecular weight (Mn) by a GPC method to show 2,750, and measured for a viscosity at 50° C. to show 2,500 cps.

EXAMPLES 11–20

Liquid polyesters were synthesized from raw materials shown in Table 4 in the same manner as in Example 9. In each preparation Example, the reaction was terminated after a reaction time of 20 hours or when the acid value became less than 15 mgKOH/g. The resultant liquid polyesters were measured for a number average molecular weight and a viscosity. Table 4 shows the results.

TABLE 4

| Example | Cyclic acid anhydride (A) | Epoxy compound (B) | Partially saponified oil & fat (C) Hydroxyl group-containing compound (C) | Catalyst, etc. | Molecular weight Mn | Viscosity (50° C.) (cps) |
|---|---|---|---|---|---|---|
| 8 | HHPA 296.5 g | BGE 78.0 g | 20% saponified linseed oil 36.9 g | DMBA 1.35 g | 2,000 | 25,000 |
| 9 | MHPA 84.0 g | GMA 42.6 g DGE 42.8 g | 20% saponified linseed oil 36.9 g | DMBA 1.35 g hydroquinone 0.213 g | 2,750 | 25,000 |
| 10 | MHPA 84.0 g | GMA 42.6 g DGE 42.8 g | 33% saponified linseed oil 22.1 g | DMBA 1.35 g hydroquinone 0.213 g | 2,840 | 13,000 |
| 11 | MHPA 84.0 g | GMA 42.6 g DGE 42.8 g | 50% saponified linseed oil 14.8 g | DMBA 1.35 g hydroquinone 0.213 g | 3,000 | 17,500 |
| 12 | MHPA 84.0 g | GMA 42.6 g DGE 42.8 g | 20% saponified tung oil 36.5 g | DMBA 1.35 g hydroquinone 0.213 g | 2,850 | 3,000 |
| 13 | MHPA 84.0 g | GMA 28.4 g DGE 64.2 g | 33% saponified linseed oil 15.5 g DdOH 2.38 g | DMBA 1.35 g hydroquinone 0.213 g | 2,520 | 11,000 |
| 14 | MHPA 84.0 g | GMA 28.4 g DGE 64.2 g | 33% saponified linseed oil 6.63 g DdOH 5.54 g | DMBA 1.35 g hydroquinone 0.213 g | 2,680 | 10,800 |
| 15 | MHPA 84.0 g | GMA 21.3 g DGE 74.9 g | 33% saponified linseed oil 6.63 g DdOH 5.54 g | DMBA 1.35 g hydroquinone 0.106 g | 3,260 | 6,500 |
| 16 | MHPA 84.0 g | GMA 42.6 g DGE 26.0 g | 20% saponified linseed oil 36.9 g | DMBA 2.75 g hydroquinone 0.28 g | 2,750 | 28,000 |
| 17 | MHPA 42.0 g TdAH 74.1 g | GMA 42.6 g DGE 26.0 g | 20% saponified linseed oil 36.9 g | DMBA 2.7 g hydroquinone 0.28 g | 3,160 | 12,600 |
| 18 | TdAH 148.2 g | GMA 42.6 g DGE 26.0 g | 20% saponified linseed oil 36.9 g | DMBA 1.35 g hydroquinone 0.213 g | 3,900 | 2,400 |
| 19 | TdAH 148.2 g | GMA 42.6 g DGE 26.0 g | 20% saponified linseed oil 24.6 g | DMBA 1.35 g hydroquinone 0.213 g | 5,200 | 3,200 |
| 20 | TdAH 148.2 g | GMA 42.6 g DGE 26.0 g | 20% saponified linseed oil 12.3 g | DMBA 1.35 g hydroquinone 0.213 g | 9,750 | 6,300 |

COMPARATIVE EXAMPLE 3

A 500-ml four-necked round-bottom flask having a stirrer, a temperature sensor, a nitrogen-introducing tube and a condenser was charged with 25.0 g of linseed oil, 77.0 g of HHPA, 36.0 g of GMA, 32.0 g of BGE, 3.9 g of BuOH, 1.35 g of DMBA and 0.213 g of hydroquinone, and the temperature inside the flask was increased to 85° C. with stirring while the flask was placed in a hot water bath. As the polymerization proceeded, the reaction mixture in the flask became viscous, and the reaction was further continued for 10 hours under the same conditions. The reaction product was measured for an acid value to show 20 mgKOH/g. The reaction mixture was further heated at 85° C. for 5 hours, and the reaction product was measured for an acid value to show 15 mgKOH/g. The reaction product was allowed to cool to terminate the reaction.

The so-obtained liquid was somewhat turbid, and it was measured for a number average molecular weight (Mn) by a GFC method to show 2,340, and measured for a viscosity at 50° C. to show 17,000 cps. When this liquid polymer was allowed to stand at room temperature for 1 day, it was separated into two phases.

COMPARATIVE EXAMPLE 4

A 500-ml four-necked round-bottom flask having a stirrer, a temperature sensor, a nitrogen-introducing tube and a condenser was charged with 84.0 g of MHPA, 42.6 g of GMA, 42.8 g of DGE, 7.9 g of DdOH, 1.35 g of DMBA and 0.213 g of hydroquinone, and the temperature inside the flask was increased to 85° C. with stirring while the flask was placed in a hot water bath. As the polymerization proceeded, the reaction mixture in the flask became viscous, and the reaction was further continued for 10 hours under the same conditions. The reaction product was measured for an acid value to show 15 mgKOH/g. The reaction mixture was further heated at 85° C. for 5 hours, and the reaction product was measured for an acid value to show 15 mgKOH/g. The reaction product was allowed to cool to terminate the reaction.

The so-obtained viscous liquid was measured for a number average molecular weight (Mn) by a GPC method to show 2,750, and measured for a viscosity at 50° C. to show 11,500 Cps.

Benzoyl peroxide and cobalt naphthenate were added to, and fully mixed with, the liquid polyesters obtained in Examples 8–20 and Comparative Examples 3 and 4. In this case, the amount of the benzoyl peroxide and the amount of the cobalt naphthenate were 3% by weight based on each liquid polyester. The resultant curable liquid resin compositions were respectively applied onto tin plates with a 0.5 mil applicator to form films, and heated under various temperature conditions for a predetermined period of time. The cured films were measured for physical properties as follows, and Table 5 shows the results.

Pencil hardness: Measured according to JIS K-5440.

Adhesion: Remaining percentage (%) by a Cellophane tape peel test (cross cut method).

Resistance to embrittlement under retorting treatment: Whitening after 1 hour treatment in an autoclave at 130° C.

A: Not whitened, B: Slightly whitened, X: Whitened

Solvent resistance: Remaining percentage (%) after MEK rubbing 50 times.

Yellowing: Color difference meter (CR-200, supplied by Minolta Camera Co., Ltd.), Δ(Lab method) Δb value

TABLE 5

| Resin | Curing conditions Temperature (°C.)/time | Pencil hardness | Adhesion % |
|---|---|---|---|
| Example 8 | 25/24 h | HB | 70 |
| Example 9 | 100/10 min. | HB | 92 |
| Example 9 | 100/10 min. → 25/12 h | H | 95 |
| Example 10 | 100/10 min. | HB | 92 |
| Example 10 | 100/10 min. → 25/12 h | H | 100 |
| Example 11 | 100/10 min. | B | 97 |
| Example 11 | 100/10 min. → 25/12 h | HB | 100 |
| Example 12 | 100/10 min. | HB | 97 |

TABLE 5-continued

| Example 12 | 100/10 min. → 25/12 h | H | 100 |
|---|---|---|---|
| Comparative Example 3 | Gelation after addition of catalyst | — | — |
| Comparative Example 4 | 150/10 min. | tack | 50 |
| Comparative Example 4 | 200/20 min. | 4B | 70 |
| Example 13 | 130/10 min. | H | 100 |
| Example 13 | 150/10 min. | 3H | 100 |
| Example 13 | 200/2 min. | 2H | 100 |
| Example 14 | 130/10 min. | 2H | 100 |
| Example 14 | 150/10 min. | 2H | 100 |
| Example 14 | 200/2 min. | HB | 90 |
| Example 15 | 130/10 min. | 2B | 90 |
| Example 15 | 150/10 min. | HB | 100 |
| Example 15 | 200/2 min. | B | 95 |
| Example 16 | 130/10 min. | 3H | 100 |
| Example 17 | 130/10 min. | 3H | 100 |
| Example 18 | 130/10 min. | 2H | 100 |
| Example 19 | 130/10 min. | 3H | 100 |
| Example 20 | 130/10 min. | 3H | 100 |

| Resin | Resistance to embrittlement under retorting treatment | Solvent resistance (%) | Yellowing Δb value |
|---|---|---|---|
| Example 8 | B | 60 | 14.5 |
| Example 9 | A | 80 | 10.3 |
| Example 9 | A | 95 | 10.5 |
| Example 10 | A | 80 | 9.0 |
| Example 10 | A | 95 | 9.2 |
| Example 11 | A | 80 | 7.8 |
| Example 11 | A | 90 | 8.0 |
| Example 12 | A | 80 | 10.5 |
| Example 12 | A | 90 | 10.0 |
| Comparative Example 3 | — | — | — |
| Comparative Example 4 | X | 0 | — |
| Comparative Example 4 | X | 10 | 3.1 |
| Example 13 | A | 90 | 6.7 |
| Example 13 | A | 100 | 9.5 |
| Example 13 | A | 100 | 5.9 |
| Example 14 | A | 100 | 3.0 |
| Example 14 | A | 100 | 4.6 |
| Example 14 | A | 95 | 4.2 |
| Example 15 | B | 80 | 3.1 |
| Example 15 | A | 90 | 2.8 |
| Example 15 | A | 90 | 1.1 |
| Example 16 | A | 100 | 10.2 |
| Example 17 | A | 100 | 11.5 |
| Example 18 | A | 100 | 10.3 |
| Example 19 | A | 100 | 10.5 |
| Example 20 | A | 100 | 9.6 |

As explained above, the present invention can easily provide a low-temperature curing liquid polyester which can be used as a solvent-free coating composition, a film-forming material of an ink, a curable liquid resin for an adhesive, a compatibilizer, a surface modifier, a pigment dispersing agent, or a metal chelating agent. Further, the liquid polyester of the present invention has its terminal functional groups formed of oxidation-curable unsaturated aliphatic esters so that the prevention of the curing by oxygen in air can be overcome and that the liquid polyester can be cured even when the amount of an incorporated catalyst is relatively small. Moreover, the liquid polyester of the present invention has its terminals formed of unsaturated aliphatic acid which is inherently poor in compatibility to the polyester, so that it can be used as a compatibilizer or a dispersing agent for alkyd-containing resins.

What is claimed is:

1. A liquid polyester obtained by reacting, in a one-step process, a cyclic acid anhydride (A) containing at least 10 mol % of at least one of cyclic acid anhydrides of the formulae (a) to (e),

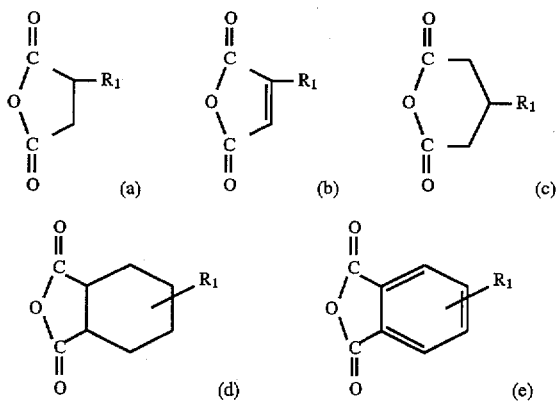

wherein $R_1$ is a saturated or unsaturated aliphatic hydrocarbon group having 4 to 25 carbon atoms, with a monoepoxide (B) which contains 5 to 100 mol % of at least one compound selected from the group consisting of glycidyl methacrylate, glycidyl acrylate, acryl glycidyl ether and glycidyl cinnamate, in the presence of a hydroxyl group-containing compound (C) which is added in an amount of 0.001 to 0.2 equivalents per mole of the cyclic acid anhydride (A), the molar ratio of cyclic acid anhydride (A) to monoepoxide (B) being 10:8–10:12.

2. A liquid polyester obtained by reacting a cyclic acid anhydride (A) containing at least 10 mol % of at least one of cyclic acid anhydrides of the formulae (a) to (e),

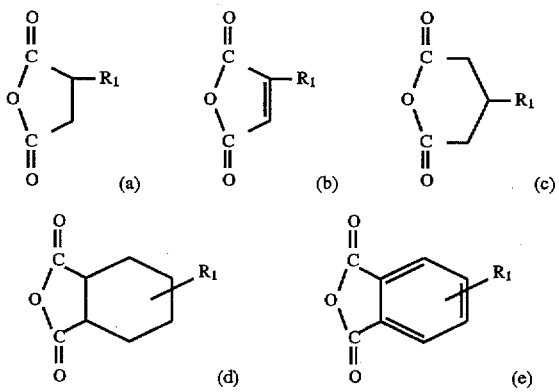

wherein $R_1$ is a saturated or unsaturated aliphatic hydrocarbon group having 4 to 25 carbon atoms, with a monoepoxide compound (B) which contains 5 to 100 mol % of at least one compound selected from the group consisting of glycidyl methacrylate, glycidyl acrylate, acryl glycidyl ether and glycidyl cinnamate, in the presence of a dry or semi-dry partially saponified fat and oil having a saponification ratio of 5 to 90%, the molar ratio of cyclic and anhydride (A) to monoepoxide compound (B) being 10:8–10:12.

3. A liquid polyester according to claim 1, wherein the liquid polyester is obtained in the presence of a radical polymerization inhibitor in an amount of 0.1 to 4% by weight based on the monoepoxide (B).

4. A liquid polyester according to claim 1, wherein the liquid polyester has a number average molecular weight of 1,000 to 30,000 and a viscosity, measured at 50° C., of 100 to 500,000 cps.

5. A film-forming material comprising the liquid polyester as recited in claim 4 and at least one of a radical polymerization initiator and a photopolymerization initiator.

6. A liquid polyester according to claim 2, wherein the hydrocarbon group is linear.

7. A liquid polyester according to claim 2, wherein the liquid polyester is obtained in the presence of a radical polymerization inhibitor in an amount of 0.1 to 4% by weight based on the monoepoxide (B).

8. A liquid polyester according to claim 2, wherein the partially saponified fat and oil is added in an amount of 0.01 to 2 equivalents per mole of the cyclic acid anhydride (A).

9. A liquid polyester according to claim 2, wherein the liquid polyester is obtained in the presence of a hydroxyl group-containing compound (C).

10. A liquid polyester according to claim 9, wherein the hydroxyl group-containing compound (C) is added in an amount of 0.001 to 0.2 equivalents as a total amount of the hydroxyl group-containing compound (C) and the partially saponified fat and oil, per mole of the cyclic acid anhydride (A).

11. A liquid polyester according to claim 10, wherein the partially saponified fat and oil is added in an amount of 5 to 100 mol % based on the hydroxyl group-containing compound (C).

12. A liquid polyester according to claim 2, wherein the liquid polyester has a number average molecular weight of 1,000 to 30,000 and a viscosity, measured at 50° C., of 100 to 500,000 cps.

13. A film-forming material comprising the liquid polyester as recited in claim 12 and at least one member selected from the group consisting of a radical polymerization initiator, a photopolymerization initiator and a drier.

* * * * *